INVENTORS
ROBERT L. GRECO
GERARD C. WRIGHT
BY

ATTORNEYS

United States Patent Office 3,419,265
Patented Dec. 31, 1968

3,419,265
DOCUMENT STACKER APPARATUS
Robert L. Greco, Penfield, and Gerard C. Wright,
Rochester, N.Y., assignors to Xerox Corporation,
Rochester, N.Y., a corporation of New York
Filed Apr. 21, 1967, Ser. No. 632,802
8 Claims. (Cl. 271—86)

ABSTRACT OF THE DISCLOSURE

A document transport system wherein fed documents are electrostatically tacked to a light, highly reflective transport belt which, in an exposure zone, is held flat against the ported surface of a vacuum manifold. As the document leaves the exposure zone, it is detacked from the surface of the first transport and advanced in an opposite direction on a second transport by means of vacuum and moving belts. When the document leaves this second transport, it enters a stacker transport of the vacuum-moving belts design where it is appropriately stripped off to settle face down in a stacker tray. Adjustable with stripper fingers there is a backing assembly in the stacker which rides on the stacker tray to restrain the stacked documents from sliding away from the front of the tray where they are readily accessible to the operator.

Background of the invention

This invention relates to transport systems for sheet material generally, and, more specifically to original document transport systems in high speed duplicating apparatus.

Presently, duplicating apparatus are widely used to make multiple copies of a series of original documents. In every instance, speed and accuracy of reproduction are two significant factors constantly being improved upon.

With the higher speeds and quality resolution possible with present technologies in the copying technique itself, a limiting factor affecting these two aspects of the apparatus may be traced to the system which manipulates the original documents before and after duplication.

In most high speed duplicators, automatic document feed is a very desirable, if not essential, feature, for without the speed afforded by the duplicating process itself, such as flash exposure and xerographic processing, would be compromised by the manual manipulations by the operator.

In such high speed automatic duplicators, a transport system preferrably should be provided to receive individually documents from a document feeder and convey each one rapidly to an exposure zone, for example, where the document may be flash exposed as many times as necessary. After exposure, the documents exposed should then be returned as soon as possible to the operator. This rapid return of copied documents reduces the period of time during which these documents are internal with respect to the apparatus and thereby reduces the chance of loss or damage if ever an apparatus-originated fire or other serious malfunction occurs.

Physically, the document supporting surface of the transport in the exposure zone of the apparatus should be as flat as possible to insure that a document on this surface will lie in the usually shallow depth of field of the duplicating lens which focuses the document image onto a light-sensitive receptor.

This physical condition of the transport has been maintained by the prior art through the use of multi-roller transport systems wherein one roller is spring-loaded to tension the usually heavy rubber transport belt thereby maintaining the desired flatness.

This technique has suffered, however, in the area of handling a series of different types of documents, such as those which are not always inclined to lay flat on the surface of the belt, e.g., previously folded documents or crinkled onion-skin documents. To overcome this, since electrostatic tacking has limited efficacy on thick insulating surfaces, the prior art has utilized vacuum transport systems. Under the influence of vacuum suction, the documents not inclined to lay flat naturally because of a prior folded condition are maintained flat against the belts of the document transport.

However, these vacuum systems have undesirable aspects in performance. If a document is placed under the influence of a vacuum suction originating along the longitudinal spaces between the belts and parallel to the direction of movement, the document will maintain its relation to the sources of suction throughout its advancement along the transport path. This means that if a crinkled onion-skin document is conveyed and its crinkles are parallel to the areas of suction, the crinkles will be preserved while the document, as a whole, is "flat" with the moving belts. If the crinkles are significant, then those crinkled areas existing between sources of suction may be outside the depth of field of the lens system employed thereby distorting the copies.

Furthermore, in the case of a vacuum transport as well as the uniform thick rubber belt, the background seen through a thin, almost translucent, onion-skin document by the light-sensitive receptor is objectionable. This background may include the dark vacuum ports and/or the usually dark rubber belt or belts. Unfortunately, a compromise in the quality of reproduction must be endured when using prior art transport systems.

Additionally, the heavy rubber belt used with tensioned rollers also serves to create a serious belt tracking problem when the belt's width-to-length ratio becomes too great as it does in the case of standard letter size documents. This necessitates expensive and complicated tracking correction methods.

Summary of the invention

The transport system of the present invention provides for the rapid advancement of a document to a stacker unit where it is separated from the stacker transport at a suitable point therealong so as to fall to a document tray where the copied documents are neatly stacked. This tray is located exteriorly to the reproducing apparatus to permit ready access by an operator.

Therefore, it is an object of the present invention to improve document transport systems.

It is also an object of the present invention to improve the stacking of documents after reproduction.

It is another object of the present invention to provide a readily accessible stack of copied documents in an orderly stack regardless of the size of documents.

It is a further object of the present invention to improve backing assemblies of stacker units.

These and other objects which may become apparent are accomplished in accordance with the principles of the present invention wherein a continuously operating stacker transport advances the copied documents to a stacker located substantially externally to the apparatus. This stacker utilized a third vacuum transport to effectively convey the copied documents to a point where they are stripped from the vacuum stacker transport and deposited in the stacker tray such that a stack of such documents is easily accessible to the operator regardless of their size. The stacker unit itself employs adjustable stripping fingers cooperatively associated with an adjustable back member which will permit documents to be stacked in the order copied without the possibility of documents sliding back into the apparatus. The backing member itself is adjustable in height to accommodate the distance between the document tray and the stacker transport.

*Brief description of the drawings*

For a better understanding of the invention as well as other objects and further features thereof, reference may be made to the following detailed description of the invention to be read in connection with the accompanying drawings wherein:

FIG. 10 is a partial view of the interior of the document stacker unit showing an adjustable back member.

*Description of the preferred embodiment*

Figure 1:
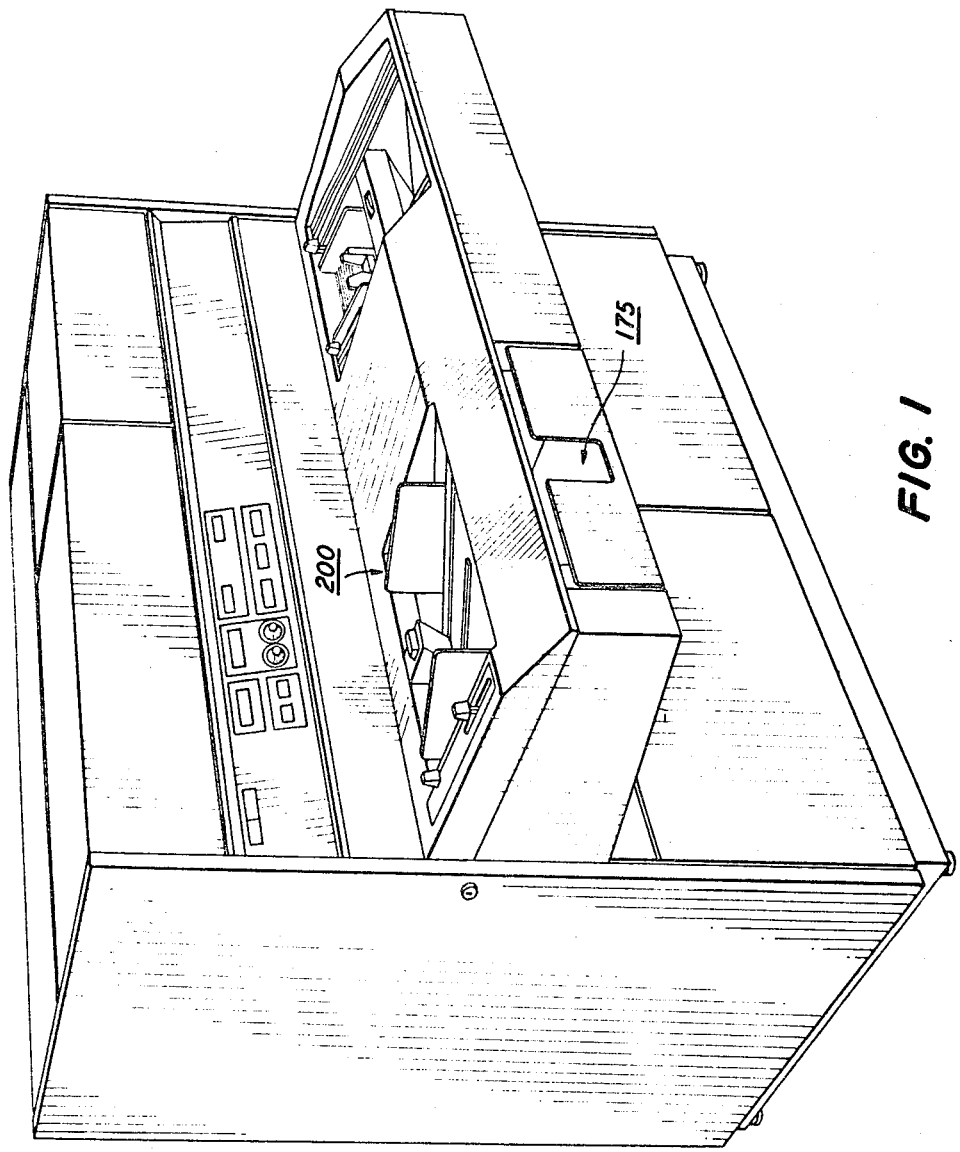
FIG. 1 is a perspective view of a xerographic reproducing apparatus in which the present invention may be utilized.

Referring specifically to FIG. 1, there is illustrated a perspective view of a xerographic reproduction apparatus in which the concepts of the present invention may be utilized.

As shown in FIG. 1, the reproduction apparatus includes a document feeder 200 on which is placed documents to be reproduced. Directly beneath the document feeder is a stacker unit generally designated by the reference numeral 175. The documents are fed from feeder 200 onto a transport for flash exposure, and are then returned to the stacker unit where they are accessible to the operator. The document path and the manner in which the documents are conveyed through this path in the apparatus of FIG. 1 may be more clearly seen with reference to FIG. 2.

Figure 2:
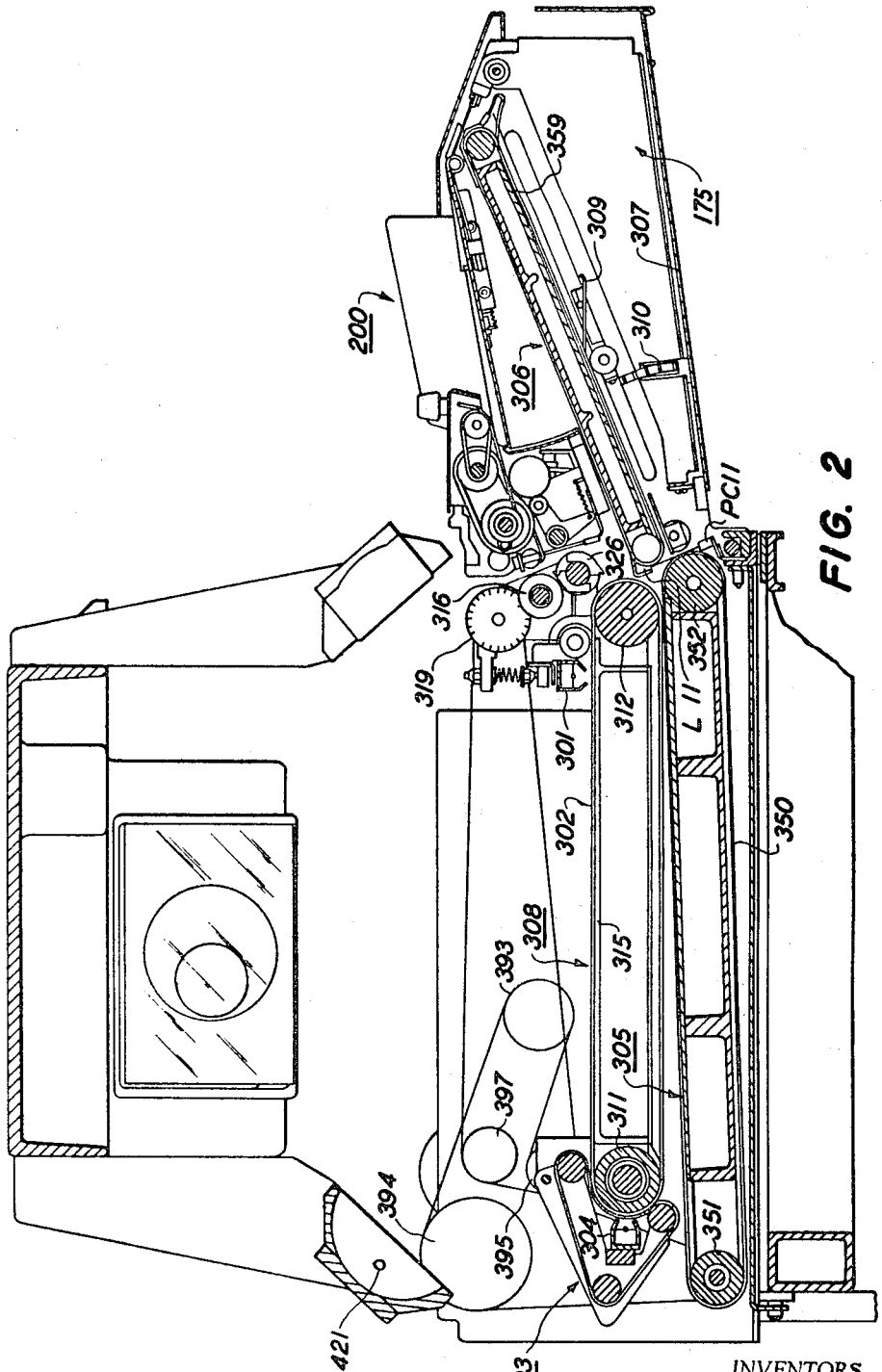
FIG. 2 is a sectional view of the entire document conveyor system.

FIG. 2 presents a sectional view of the document path from a document feeder 200 to a document stacker 175. The feeder may be of any conventional design and, for example, may be of a design as disclosed in copending application Ser. No. 632,793, filed concurrently herewith in the name of Klaus K. Stange, Adalburt A. Lux, and Thomas B. Michaels. The documents placed in the document feeder 200 are urged toward feed roller 316 by a separator feed belt 260 in the feeder itself. A document registration gate 326 is positioned as shown in FIG. 2 at the output of the feeder to selectively obstruct passage of the document past the feed roller 316. When the document registration gate is down, it is in a position to permit passage of the document past the feed roller. The document is then advanced under an electrostatic tacking device such as a conventional corotron 301 as shown in FIG. 2.

The results of the tacking corotron is to electrostatically adhere the document onto the exposure transport 308 and specifically onto the insulating exposure transport belt 302 which draws the document from the feed roller 316 into an exposure zone which substantially lies between the tacking corotron 301 and a turn-around assembly generally designated by reference numeral 303 located at the other end of the exposure transport.

The document adhering to the surface of the exposure transport belt 302 is then conveyed to an exposure zone at which time the exposure transport belt is stopped and the document is, for example, flash exposed by exposure lamps.

After exposure the exposure transport is started again and the document enters the turn-around assembly where a suitable detacking device shown as a conventional corotron 304 is employed to neutralize the electrostatic charge which attracts the document to the surface of the exposure transport belt.

The document, still under the influence of the turn-around assembly 303, leaves the turn around area and is now free to be attracted by the suction of a second transport system 305 which employs a vacuum manifold. This transport system, referred to as a return transport, returns the document to a position adjacent the other end of the exposure transport where the document leaves the return transport and is guided into the influence of a third transport system, referred to as the stacker transport, which advances the document into the stacker.

The stacker 175 will receive the document from the stacker transport 306 after stripper fingers 309 urge the advancing document away from the vacuum influence of the stacker transport. As the trailing edge of the document is broken from the vacuum, the document copied will lie face down on the stacker tray 307. The stacker tray itself is inclined so as to permit documents to slide back toward the return transport. This sliding effect is desirable to permit an orderly stack of documents to be formed in the stacker area. However, because of the fact that documents varying in size may be desired to be copied, a backing assembly generally designated by reference numeral 310 is employed to prevent the documents from sliding to the end of the stacker tray remote from the front of the apparatus. This effectively keeps the documents copied in an orderly stack at the front of the stacker tray readily accessible to the operator.

Also illustrated in FIG. 2 is part of the drive chain system for the exposure and return transports as well as feed roller 316 and the registration gate 326. A main drive sprocket wheel 393 is mechanically coupled with a drive chain to idler sprockets 394 and 395 and conveyor roller 351 to provide continuous motive power to the return transport 305. Feed roller 316 is driven by gear 319 coupled via wheel 397 to a sprocket wheel (not shown) which is fixed to the same shaft associated with sprocket wheel 395.

Reference will now be made to FIGS. 3, 4, 5 and 6 which show in detail the exposure and return transports 308 and 305, respectively, in addition to the turn-around assembly 303, feed roller 316, and document registration gate 326.

An endless exposure transport belt 302 is supported and driven by two conveyor rollers 311 and 312 which are mounted on shafts 313 to permit the belt 302 to be driven along a predetermined path. A portion of this predetermined path is directly above the ports 314 in vacuum manifold 315. These ports are present in the portion of the vacuum manifold 315 coextensive with the area of the belt's path referred to as the exposure zone.

The exposure transport belt is formed of an insulating material and has a very reflective surface which is white or optically neutral in appearance. In a position substantially equidistant from the edges of the belt there is an elongated opening or slot 345 having its longer dimension parallel to the edges of the belt. The purpose of this slot will be described hereinafter.

At the input edge of the exposure transport there is located an electrostatic tacking device shown as a conventional corotron 301. This corotron is mounted on a support member 317 which also supports a sprocket wheel 318 fixed to gear 319. Fixed to rotate with gear 319 is a power shaft 320 translating the power applied at sprocket wheel 318 to a solenoid-operated indexing clutch represented generally by reference numeral 321.

The indexing clutch 321 selectively translates power from the power shaft 320 through gear 322 and idler gear 323 to gear 324.

Idler gear 323 may be mounted on bearings to permit shaft 325 to rotate freely or this idler gear may be made of a suitable material, such as nylon, to permit shaft 325 to rotate freely through the idler gear without driving the gear itself.

Figure 6:
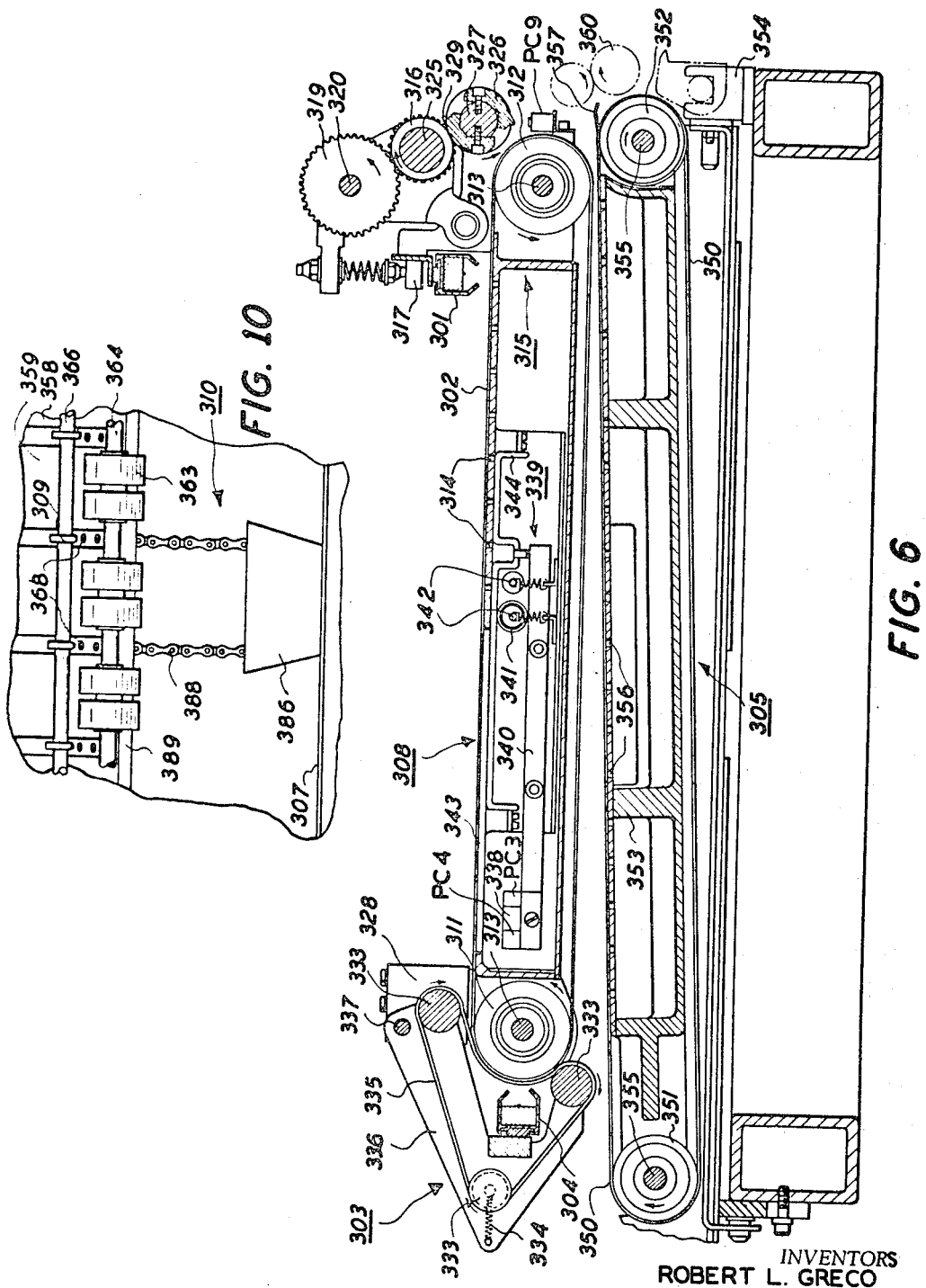
FIG. 6 is a sectional view taken along sectional line 6—6 in FIG. 5.

Gear 324 drives a shaft 327 which is journaled at both ends to rotate in the side frames 328. Spaced along and fixed to this shaft and driven thereby are a plurality of segments 326 collectively referred to as the document registration gate. As seen in FIG. 6, a cross section of one of these segments shows each segment to be irregularly shaped to provide in the position shown in FIG. 6 an abutting surface 329 to effectively block the advancement of a sheet of material or document between the feed rollers 316 and the idler rollers 330 associated with each feed roller and separating each gate segment 326. In the position shown in FIG. 6, the document registration gate will be referred to as being in an up position. This up position may be altered upon the energization of the document gate solenoid in housing 331 which energizes the indexing clutch 321 to move the abutting surface of the registration gate to no longer block the advancement of a document. In this down position, a document will be free to pass through the path between and under the influence of the feed rollers and the idle rollers and onto the exposure transport belt 302. The idler rollers 330 are mounted on shaft 327 as are the segments of the document registration gate with the difference that the idler rollers are free to rotate in a friction drive relationship with the feed rollers.

The sprocket wheel 318 also provides driving power via gear 319 to the feed roller gear 332 which is fixed on shaft 325 to drive the feed rollers. The feed rollers and the power shaft 320 for the document registration gate will be rotating continuously when the machine is in operation through the motive power supplied by main sprocket wheel 393 referred to in FIG. 2.

The turn-around assembly 303 is located at the extremity of the exposure transport opposite the feed roller and registration gate. This assembly includes three friction driven rollers 333 which are driven with the exposure transport belt. One roller is spring loaded by springs 334 to tension a plurality of small belts 335 which move in a path to contact the three turn-around rollers and in cooperation with the exposure transport belt as it is in contact with conveyor roller 311. This tensioned roller 333 is also grooved to provide guides for each of the turn-around belts. The three turn-around rollers are rotatably mounted between two side plates 336 which, in turn, are supported by side frames 328. A support shaft 337 is pivotally mounted on these side frames 328 and extends through the two side plates of the turn-around assembly. This pivot relationship permits easy access to the interior of the turn-around assembly in case of a document jam or servicing of the detack corotron 304.

Within the path of the turn-around belts and closely adjacent the exposure transport belt as it is in contact with conveyor roller 311, there is positioned a suitable electrostatic detacking device shown as a conventional corotron 304. This corotron is mounted on a support rod which is fixed to the turn-around side plates 336.

The exposure transport belt 302 is under the influence of a vacuum during its travel through the exposure zone co-extensive with the ported vacuum manifold 315. This vacuum is provided by a suitable compressor (not shown) connected to the vacuum manifold through an appropriate exhaust duct 398.

Inside the vacuum manifold within the path of the exposure transport there are located two pair of photocells PC1–PC2, and PC3–PC4. Each pair of photocells are mounted on a plate 338 which is held in position by a positioning assembly 339. This assembly includes a positioning rod 340 which is frictionally driven by way of a small rubber O-ring 341 which is mounted on a rotatable screw shaft 342. This screw shaft may be actuated from outside of the vacuum manifold to move the photocells to any particular position within a certain predetermined range. Positioned immediately above each pair of photocells is an opening 343 in the vacuum manifold to render each pair of photocells accessible to light when the slot 345 in the exposure transport belt is over the opening in the vacuum manifold. The positioning assemblies 339 for these photocells are held stationary relative to the vacuum manifold and the openings 343 therein by a frame member 344 which is secured to the interior surface of the ported portion of the manifold.

Spaced adjacent from the exposure transport belt 302 as it contacts conveyor roller 312 and centrally with respect to the edges of the belt is a photocell assembly including a photocell PC9, referred to hereinafter as the slot sense photocell, which functions to monitor the reflections from the white or highly reflective surface of the exposure transport belt. In this manner, when the slot 345 in the exposure transport belt passes the slot sense photocell PC9, this photocell will detect a light-no light transition.

The function of photocells PC1, PC2, PC3, PC4 and PC9 do not form part of the present invention and are therefore not elaborated on. An example, however, of utilization of these photocells is disclosed in copending application Ser. No. 632,662, filed concurrently herewith in the names of Gordon P. Taillie, John F. Gardner, Thomas B. Michaels, and Donald W. Gouldsmith, where accurate positioning of a document on a transport belt 302 in the exposure zone is desired.

Figure 3:
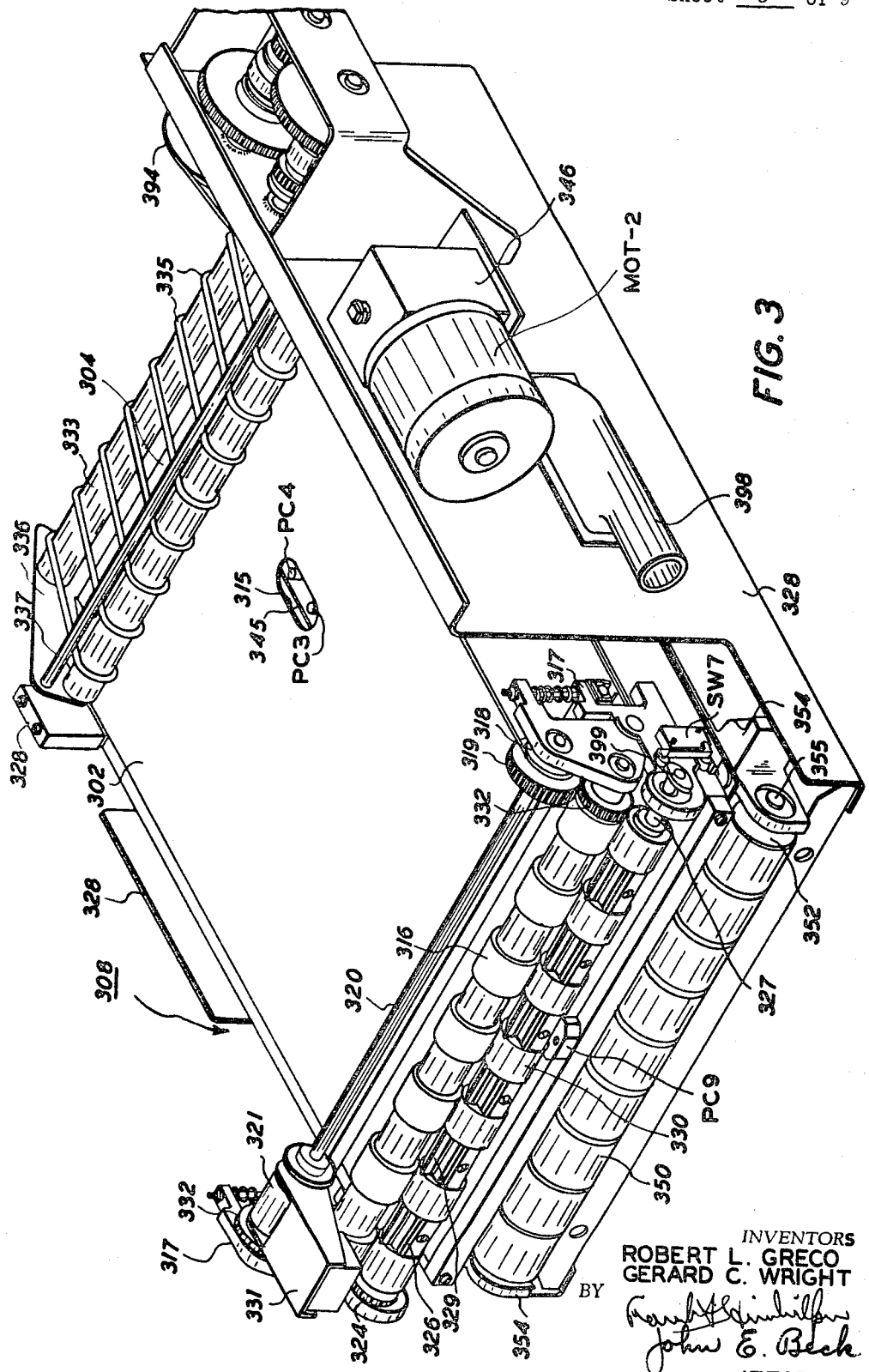
FIG. 3 is a perspective view of the exposure transport and return transport.
Figure 5:
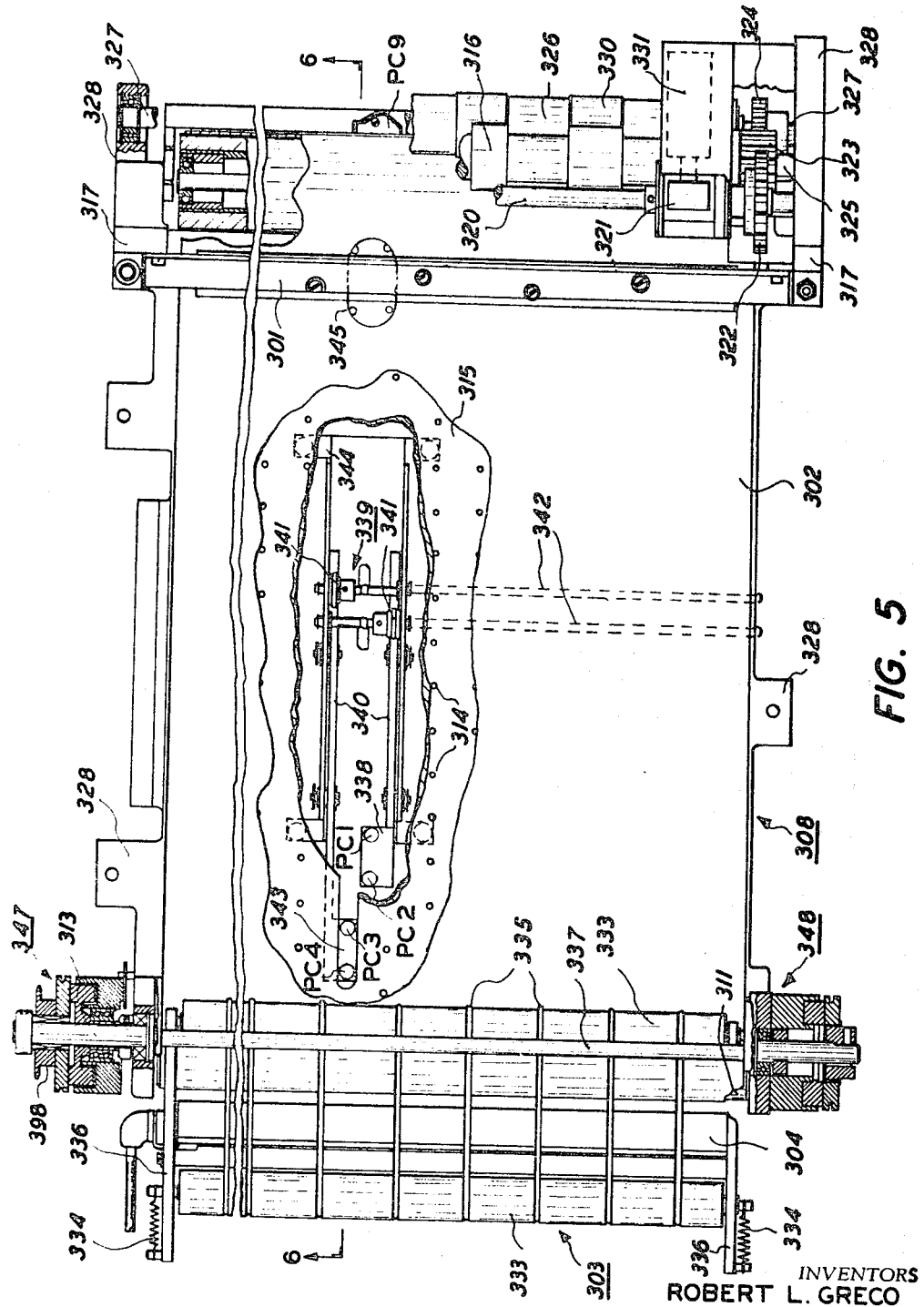
FIG. 5 is a top view of the exposure transport.

Referring specifically to FIGS. 3 and 5, there is shown the main document transport motor MOT–2 mounted on side frame 328 which, via a suitable gear box 346, provides motive power to the main sprocket wheel 393 referred to previously in connection with FIG. 2. FIGURE 5 shows bearing assembly 347 mounted on shaft 313 of conveyor roller 311 to allow power translated to the shaft from sprocket wheel 398 to freely rotate the conveyor roller. At the other end of this shaft 313, there is mounted the exposure transport brake assembly generally designated 348.

Figure 4:
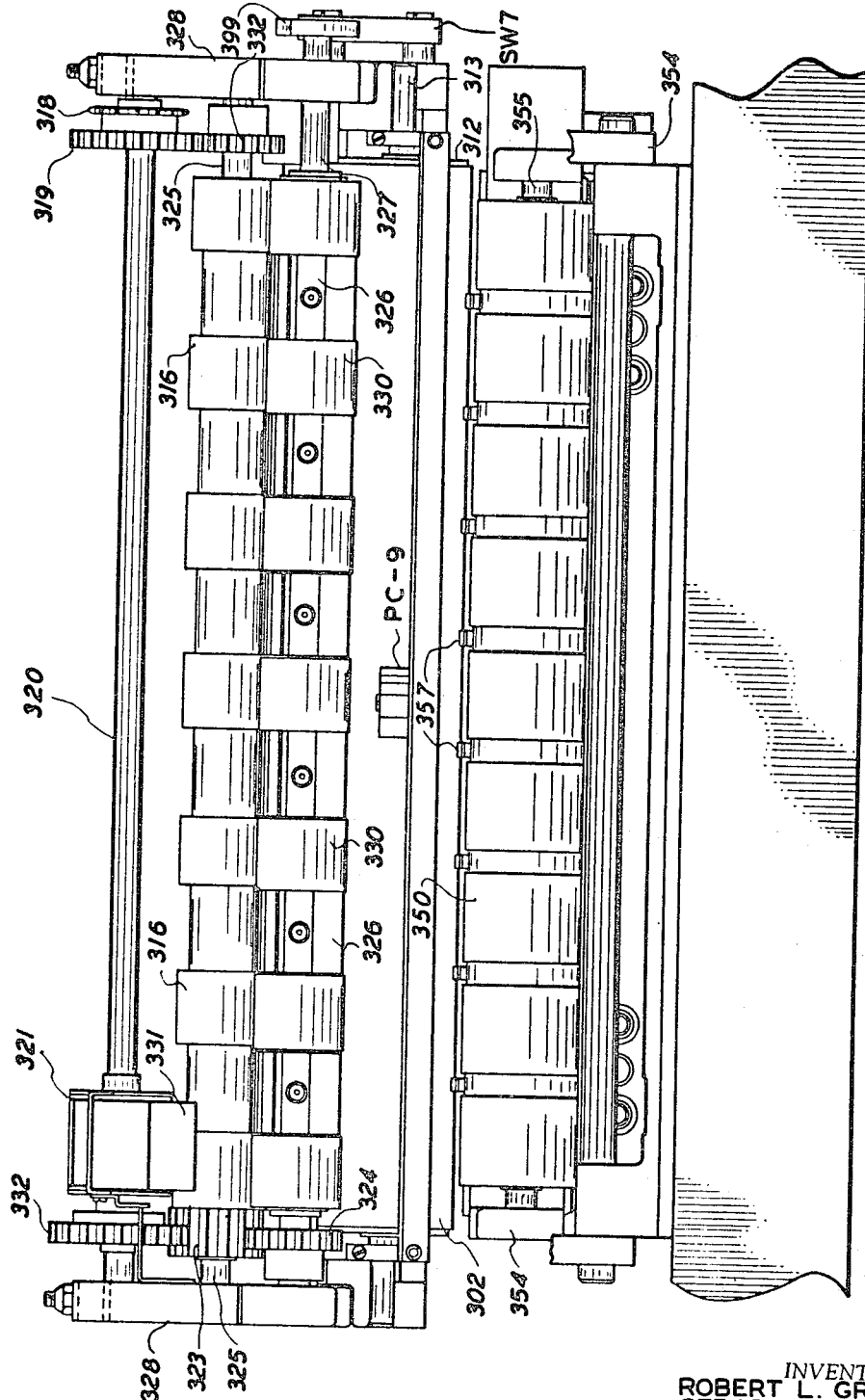
FIG. 4 is an end view of the exposure and return transports showing the registration gate.

FIGURES 3 and 4 also show the document gate switch SW7 which is activated by cam 399 fixed to shaft 327. This cam turns with the document registration gate 326 to provide an electrical signal indicative of the position of the gate 326 and its abutting surface 329.

Referring now specifically to FIGS. 3, 4 and 6, the return transport will be described. This transport 305 is comprised of a plurality of belts 350 mounted on two conveyor rollers 351 and 352, roller 351 being continuously driven by a suitable sprocket wheel (not shown) mechanically coupled to the main transport drive motor MOT–2.

Inside the return transport belts 350 and between conveyor rollers 351 and 352 there is mounted a vacuum manifold 353 which is attached to rigid member 354 which also supports the ends of shafts 355 of the conveyor rollers 351 and 352 on suitable bearings. The vacuum manifold 353 for the return transport has one surface thereof facing the exposure transport which has a plurality of ports 356 which are aligned in the spaces between adjacent return transport belts 350 to attract through suction the document being conveyed to these belts.

From the relationship between the return transport and the exposure transport and after the detacking operation in the turn-around assembly, a document previously copied will egress from the turn-around assembly and be attracted by the suction of the return transport and adhere to the constantly moving return transport belts 350. The direction of travel of this document will be opposite to the direction of the document movement in the exposure zone on the exposure transport and will exit from the return transport over a plurality of finger elements 357.

Figure 7:
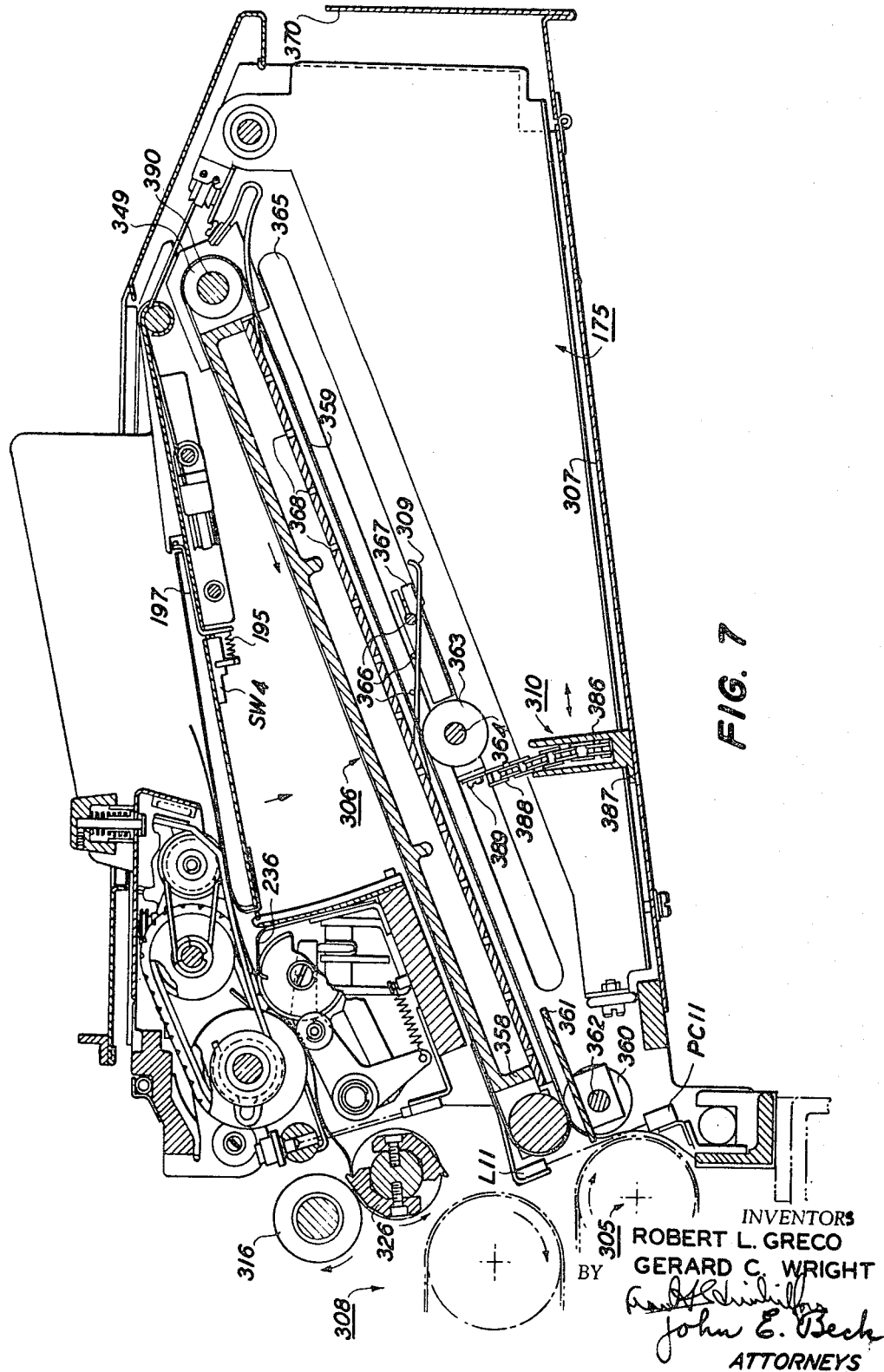
FIG. 7 is a sectional view of the stacker transport and stacker unit, in accordance with the present invention.
Figure 8:
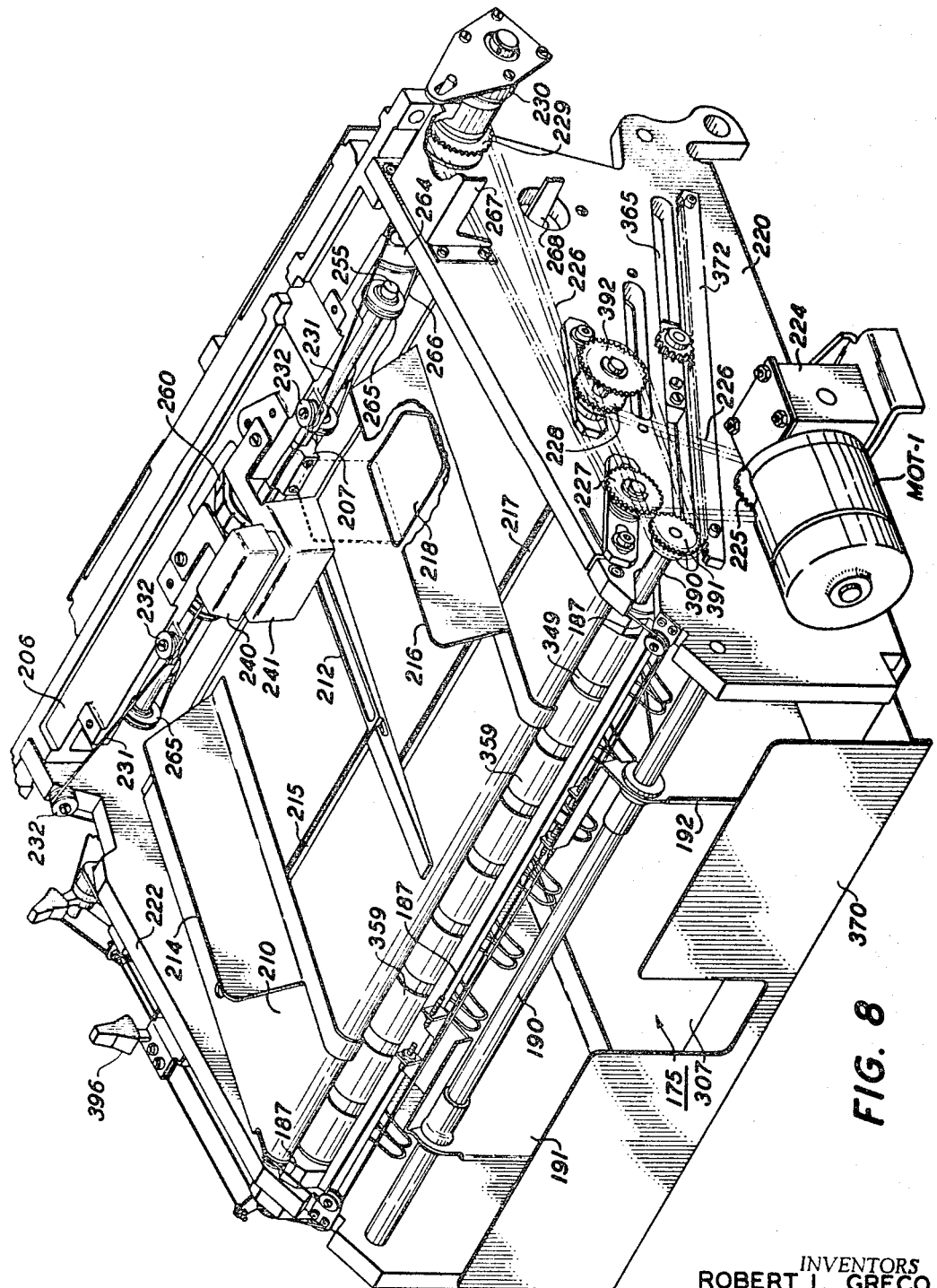
FIG. 8 is a perspective view of the stacker unit.

As the document leaves the return transport and passes over the guide fingers 357, it will enter the influence of the stacker transport 306 which is shown in FIGS. 7 and 8.

Referring now specifically to FIGS. 7 and 8, the stacker transport comprises a vacuum manifold 358 similar to that employed in the return transport which is inside the path of a plurality of stacker transport belts 359. At the input of the stacker transport shown in FIG. 7, there is a conveyor roller 360 comprised of a series of rollers having between each roller a guide element 361. The rollers of the conveyor roller 360 are mounted on shaft 362 which is journaled at both ends to rotate in a supported manner in side frame panels 220 of the document stacker 175. This conveyor roller 360 is frictionally driven by the moving stacker transport belts 359 so as to urge the document egressing from the return transport into the area of vacuum influence of the stacker transport. The ports 368 in the vacuum manifold of the stacker transport are aligned between the transport belts 359 to attract a document into friction contact with the moving transport belts. The document adhering to the stacker transport is then conveyed toward the front of the document stacker. At some point along the ported surface of the stacker vacuum manifold 358 there is located a series of stripper fingers 309 each positioned intermediate adjacent stacker transport belts. In cooperation with the stripper fingers and frictionally driven by the moving stacker transport belts, there is located a plurality of foam rollers 363 mounted on shaft 364. These rollers are free to rotate about their supporting shaft 364. Also coupled to the shaft 364 is a backing assembly 310 which is directly mounted on a support bar 389. This support bar is fixed to the shaft and rides on slots 365 in the side frame panels 220. The details of this backing assembly will be described hereinafter.

The stripper fingers 309 are interconnected via rods 366 one of which extends and is fixed to blocks 367 which are secured to shaft 364 and move with this shaft along slots 365. Therefore, stripper fingers 309 and the foam rollers 363, as well as the backing assembly 310, will all move as the one unit along slots 365 in the side frame panels 220. The position of this unit will be detailed hereinafter.

As the document on the stacker transport reaches the stripper fingers 309, it will follow the stripper fingers and break the vacuum formerly drawing it to the stacker transport belts in cooperation with the frictionally driven foam rollers 363. In this manner when the document reaches the stripper fingers 309 it will be peeled from the stacker transport and will fall onto the stacker tray 307.

The position of the shaft 364, the stripper fingers 309 and the backing assembly 310 will be dictated by the size of the documents being copied by the apparatus utilizing the concepts of the present invention. With documents having a maximum dimension equal to the greatest distance which can separate the backing assembly 310 and the hinged door 370 associated with the stacker, the stripper fingers and the backing assembly will have to be positioned at the lower extremity of the slot 365 in the side frame panels 220. In this manner, the document will begin peeling from the influence of the stacker transport almost as soon as it has entered this transport. As the document continues to be fed into the stacker from the return transport, the lead edge of this document will be forced along the stacker tray toward the door of the stacker. As the trailing edge is peeled from the stacker transport, the document will completely settle to the stacker tray 307 and this trailing edge may abut the backing assembly.

In the case of smaller documents, such as automatic data processing cards, the stripper fingers 309 and the backing assembly 310 will have to be positioned almost at the other extremity of the slot 365. In this manner, the document will be conveyed almost along the entire length of the stacker transport before it is stripped from the transport belts and permitted to fall into the space between the door 370 and the backing assembly 310. The positioning of shaft 364 and consequently stripper fingers 309 and backing assembly 310 can better be described with reference to FIG. 9.

FIGURE 8 also shows the drive train for conveyor 349 associated with the stacker transport. Shaft 390 has mounted in fixed relation thereon a sprocket wheel 391 which is mechanically linked to sprocket wheel 392. On the same shaft as sprocket wheel 392 there is mounted in fixed relation an idler sprocket 228 which is driven by drive chain 226 as it rotates around idler sprocket 227, drive sprocket 229, which may drive a conventional feeder mechanism, and drive sprocket 225 which is coupled to a suitable gear box 224. Drive sprocket 225 receives its motive power directly from motor MOT–1 mounted on side frame panel 220. In this manner, the stacker transport operates continuously with the energization of motor MOT–1.

Figure 9:
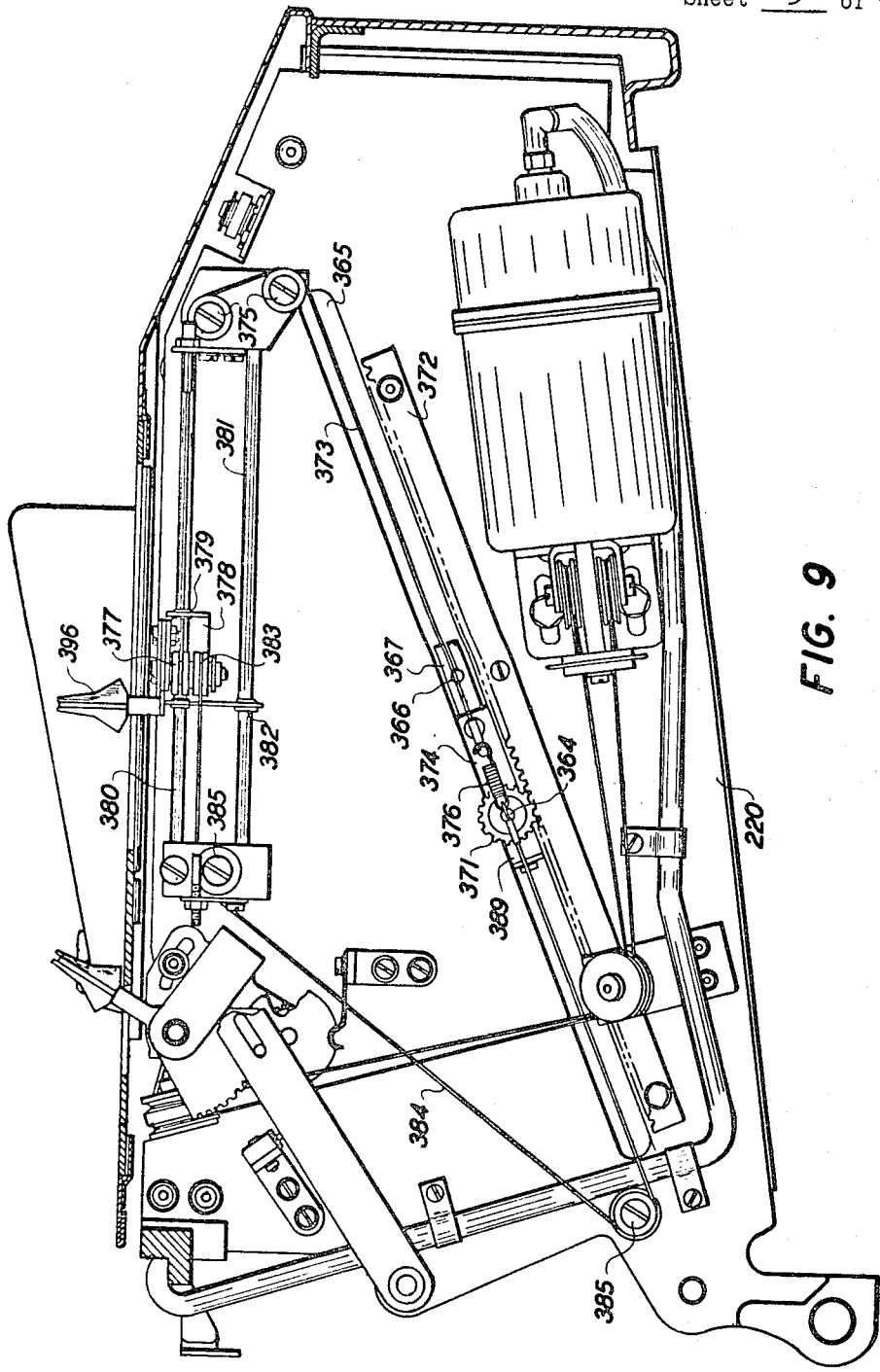
FIG. 9 is a side view of the stacker unit.

FIGURE 9 is a side view of the stacker showing the side frame panel 220 and the slot 365 therein along which rides the unit consisting of the backing assembly 310, the shaft 364 bearing the foam rollers 363 and the stripper fingers 309. On the outside of the side frame panel 220 there is mounted on shaft 364 a pinion gear 371 which is free to rotate about this shaft. The teeth of pinion gear 371 cooperate with the teeth in a rack 372 which is secured to the side frame panel and is arranged parallel to the lower edge of the slot 364. The pinion gear may be moved along the rack between the extremities of the slot 365 so as to position the stripper fingers and the backing assembly anywhere intermediate these two extremities. The actual movement of the shaft 364 and the pinion 371 is accomplished through a cable-pulley arrangement to permit the operator of the apparatus, for example, to easily select the position of shaft 364 in accordance with the documents placed in the document feeder 200.

This adjusting arrangement includes one cable 373 which extends from an attachment to anchor member 374 which is attached to the shaft 364 and around two idler pulleys 375 secured to the side frame panel 220 and around a third idler pulley 377 mounted on support flange 378 to which the other end of cable 373 is secured. This flange has an eyelet 379 which permits this flange to be moved along rod 380. This rod is spaced from and fixed to the side frame panel 220. A second such rod 381 is also attached to the side frame panel and accommodates another eyelet 382 which is also coupled to flange member 378. A suitable knob 396 is provided for the operator to move the flange member 378 along these rods 380 and 381. Flange member 378 also supports another idler pulley 383 around which a second cable 384 extends. The end of this cable is secured to the flange member. The cable 384 extends also around idler pulleys 385 and its other end is secured to one end of a spring 376. The other end of this spring is connected to the anchor member 374 fixed to the shaft 364.

With this cable-pulley arrangement the operator, when feeding large documents, will pull the knob 396 toward her or to the right as the knob is viewed in FIG. 9 thereby moving the pinion 371 along rack 372 toward the lower extremity of slot 365 in the side frame panel 220. This will permit the documents copied to be stacked neatly on the stacker tray with the lead edge of the stack proximate to the door of the stacker and readily accessible to the operator. Machine vibration or gravity will not dislodge the documents from this position to cause them to slide back into the machine in a position difficult to reach by the operator because of restraining effect of the backing assembly 310.

This backing assembly may be seen in greater detail in FIG. 10 which shows a partial view from the outside of the stacker with the door 370 in an opened condition. The foam rollers 363 are shown spaced apart on shaft 364 and the stripper fingers 309 are shown between adjacent stacker transport belts 359. The backing assembly 310 includes a container 386 which has a substantially flat exterior bottom which is inclined to slide on the stacker tray 307. The cross section of this container shown in FIG. 7 illustrates the configuration of the bottom of this container and shows an edge 387 which extends past the rear wall of the container to make it more difficult for the container to tilt in a counterclockwise direction of FIG. 7 as viewed. The container 386 is adapted to receive folds of a conventional link chain 388 having two ends connected to support member 389 which is attached to shaft 364. The backing assembly will function to provide a restraining surface for a stack of documents on the stacker tray of any height depending upon the position of the backing assembly along the stacker tray. For larger documents, as the backing assembly is moved toward the lower extremity of slot 365, the link chain 388 will fold into the container effectively reducing its length above the top of this container. When shorter documents are used and the backing assembly is moved toward the higher extremity of the slot 365, the chain folded in the container will be drawn out of the container. Consequently the chain will be extended its full length permitting the container to remain on the stacker tray while any documents on the stack exceeding the height of the container will be restrained by the chain itself. The chain may be a loop or may be two pieces of chain permitted to dangle from its support into the container 386. A link chain is preferred for utilization in this manner since it resists any excessive flexing in a direction parallel to the axis of pivot between adjacent links in the chain itself. This enables movement of shaft 364 to effectively move the container without the container tipping over or the chain flexing excessively.

Located in the stacker 175 is the document output photocell PC11 which is positioned between the return transport 305 and the input to the stacker transport 306. This photocell receives light from source L11 which is interrupted when a document leaves the return transport and enters the stacker transport. By way of photocell PC11, the documents which enter the stacker 175 may be detected and this detection utilized in suitable jam detection circuits.

Therefore, there has been disclosed a document handling system wherein a document is advanced to an exposure zone in a flat condition on an optically neutral surface of a transport belt which is held in intimate contact with the ported surface of a vacuum manifold. The document is adhered to this transport belt electrostatically.

As the document leaves the exposure zone, its electrostatic adherence to the belt is eliminated and a turnaround assembly diverts the document onto a return transport which delivers it to a stacker unit.

A stacker transport advances the document under vacuum to a point where stripper fingers separate the document from the stacker transport to allow the document to fall onto a document tray. A backing assembly extending between the document tray and the stacker transport restrain the fallen document to form a stacking area.

While the invention has been described with reference to a specific system herein, it is not confined to the details set forth, since it is apparent that other arrangements of the components may be made without departing from the scope of the invention.

What is claimed is:

1. In a document transport system, a stacker unit comprising:
    (a) a vacuum manifold having a planar ported surface;
    (b) a source of vacuum coupled to said manifold;
    (c) two conveyors, one at each end of said manifold;
    (d) a plurality of spaced apart flexible endless belts entrained on said conveyors and over said ported surface;
    (e) drive means coupled to at least one of said conveyors for moving said plurality of belts over said ported surface;
    (f) a plurality of finger elements, each of which extends between adjacent ones of said belts, said finger elements being of sufficient length and at such an angle to the plane of said belts as to divert a document being advanced by said driven belts beyond the influence of said vacuum manifold;
    (g) support means to rigidly interconnect said finger elements;
    (h) a document tray having a document-supporting planar surface facing said ported surface of said manifold and having rear and front edges in that order in the direction of advancement of a document by said endless belts;
    (i) a backing means in slidable contact with said document tray having a dimension between said document tray and said ported surface which varies substantially in direct proportion with the distance between said document tray and said plurality of belts measured in the plane of said backing means and from the point of contact of said backing means and said document tray for restraining documents diverted from said belts in the area between said backing means and said front edge, said backing means fixed to said support means and movable therewith; and
    (j) means for selectively moving said support means along a plane parallel to said ported surface and between said conveyors.

2. A stacker unit as defined in claim 1 wherein said backing means includes:
    (a) a container having a relatively flat bottom in contact with said document tray, a substantially planar exterior side facing said front edge, and an opening facing said belts; and
    (b) an element passing through said opening and having two ends fixed to said support means and a midpoint secured to the inside of said container, said element having greater flexibility in the plane formed thereby than in the plane substantially perpendicular to said plane formed by said element, said plane formed by said element being substantially parallel to said planar exterior side.

3. A stacker unit as defined in claim 2 wherein said element is a length of link chain having the axis of pivot between adjacent links substantially perpendicular to the plane formed by said element.

4. In a stacker unit wherein documents are restrained in an orderly stack on a document tray, an adjustable restraining member comprising:
    (a) a container having a relatively flat bottom in slidable contact with said document tray, a substantially planar exterior side facing said document stack, and an opening opposite said bottom;
    (b) an element passing through said opening and having two ends supported in spaced relation exteriorly to said container and a midpoint secured to the inside of said container, said element characterized by greater flexibility in the plane formed by said element than in the plane substantially perpendicular to said plane formed by said element, said plane formed by said element being substantially parallel to said planar exterior side of said container.

5. A stacker unit for conveyed documents comprising.
    (a) a stacker vacuum manifold having a ported surface;
    (b) a stacker conveyor at each end of said ported stacker manifold;
    (c) a plurality of endless transport belts entrained on said conveyors and over said ported surface of said stacker manifold;

(d) drive means to drive at least one of said stacker conveyors;

(e) a source of vacuum connected to said stacker manifold;

(f) stripper means to selectively separate a document from said belts including a plurality of finger elements each one of which is associated with two adjacent belts of said plurality of transport belts and passes through the plane of said two adjacent belts, said finger elements being interconnected to form a stripper unit and being movable in a plane parallel to said ported surface of said stacker manifold and between said stacker conveyors;

(g) adjustable stacker tray means positioned relative to said stripper means to receive said document after separation thereof from said belts including a planar document-supporting surface having a front edge, a rear edge, and a backing member in contact with said document-supporting surface and positioned between said front and rear edges; and (h) said backing member being fixed relative to said stripper unit and movable therewith to restrain documents separated from said stacker transport to an area of said document supporting surface defined substantially by said backing member and said front edge.

6. A document transport as defined in claim 5 wherein said backing member includes:

(a) a container having at least one planar exterior side facing said front edge and a substantially planar exterior bottom in contact with said document supporting surface;

(b) a pair of elements each having one end fixed relative to said stripper unit and movable therewith and spaced from the other, and the other end terminating in said container;

(c) said elements being defined by having a greater flexibility in a plane substantially parallel to said planar exterior side than in a plane substantially perpendicular of said planar exterior side.

7. A document transport as defined in claim 6 wherein said other ends of said elements are fixed to the interior of said container.

8. A document transport as defined in claim 6 wherein said other ends of said elements are coupled together.

References Cited

UNITED STATES PATENTS 1,836,856   12/1931   Lloyd _____ 271—68

EDWARD A. SROKA, *Primary Examiner.*